United States Patent Office 3,219,655
Patented Nov. 23, 1965

3,219,655
AZO DYESTUFFS
Karl Ronco, Muttenz, Switzerland, assignor to Ciba Limited, Basel, Switzerland, a company of Switzerland
No Drawing. Filed Dec. 7, 1961, Ser. No. 157,810
Claims priority, application Switzerland, Dec. 12, 1960, 13,906/60
7 Claims. (Cl. 260—203)

This invention provides azo-dyestuffs which are free from groups imparting solubility in water and correspond to the general formula:

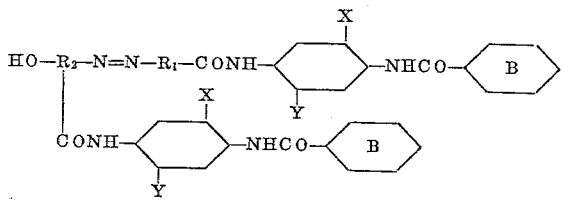

in which $R_1$ represents a benzene residue which is bound in the 1-position to the azo linkage and in the 3-position to the carbonyl group, and in 6-position contains a halogen atom, an alkoxy group or a phenoxy group $R_2$ represents a naphthalene residue to which the azo linkage, the hydroxyl group and the —CONH— group are bound in the 1-, 2- and 3- positions, respectively. X and Y each represent a halogen atom or alkyl group, and when X is a halogen atom, Y may also represent an alkoxy group, and the benzene residue B may contain further substituents.

The invention also provides a process for the manufacture of the aforesaid azo-dyestuffs, wherein one molecular proportion of a carboxylic acid halide which is free from groups imparting solubility in water and corresponds to the formula:

(1)     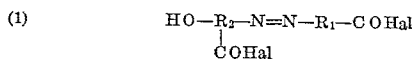

in which $R_1$ represents a benzene residue which is bound in the 1-position to the azo linkage and in the 3-position to the carbonyl group and contains in the 6-position a halogen atom or alkoxy or penoxy group, $R_2$ represents a naphthalene residue to which the azo linkage, the hydroxyl group and the carboxylic acid halide group are bound in the 1-, 2- and 3-positions repectively, is reacted with two molecular proportions of an amine of the formula:

(2)     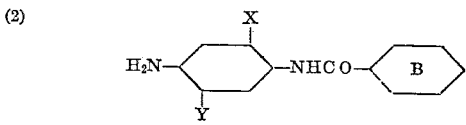

in which X and Y each represent an alkyl group or especially a halogen atom, for example, a bromine or preferably a chlorine atom, and, when X is a halogen atom, Y may also represent an alkoxy group, and the benzene residue B may contain further substituents, for example, halogen or alkyl or alkoxy groups.

The starting materials used must be free from groups imparting solubility in water such as sulphonic acid, sulphonic acid amide and carboxylic acid groups.

The azo-carboxylic acids, from which the acid halides of the above Formula 1 are obtained can be made coupling the diazo-compound of a meta-aminobenzene carboxylic acid with a 2:3-hydroxynapthoic acid.

As meta-aminobenzene carboxylic acids are advantageously used those of the formula:

(3)     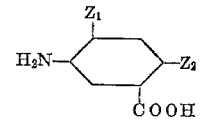

in which $Z_1$ represents a halogen atom or an alkoxy or phenoxy group, and $Z_2$ represents a hydrogen or halogen atom. Especially useful is the aminobenzene carboxylic acid of the formula:

(4)     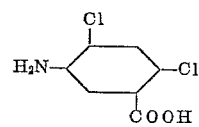

The 2:3-hydroxynaphthoic acid used as coupling component may be substituted in the benzene ring that does not contain the carboxylic acid group, for example, by a halogen atom, especially a bromine atom in the 6-position, or by an alkoxy or alkyl group. Owing to its ready availability, it is of advantage to use the 2:3-hydroxynaphthoic acid itself.

The azo-dicarboxylic acids so obtained are treated with an agent capable of converting carboxylic acids into their halides, for example, into their chlorides or bromides. Such agents are more especially phosphorus halides, such as phosphorus pentabromide, phosphorus trichloride or phosphorus pentachloride, or phosphorus oxyhalides, or preferably thionyl chloride.

The treatment with the above acid-halogenating agents is advantageously carried out in an inert organic solvent, such as chlorobenzene, for example, mono- or di-chlorobenzene or toluene, xylene or nitrobenzene.

For the preparation of the carboxylic acid halides it is generally advantageous, since the azo-dicarboxylic acids are prepared in an aqueous medium, first to dry the acids or to free them from water by azeotropic distillation with an organic solvent. The azeotropic drying process may, if desired, be carried out immediately before the treatment with the acid-halogenating agent.

The new dyestuffs are valuable red pigments. Especially valuable are the dyestuffs of the formula:

(5)     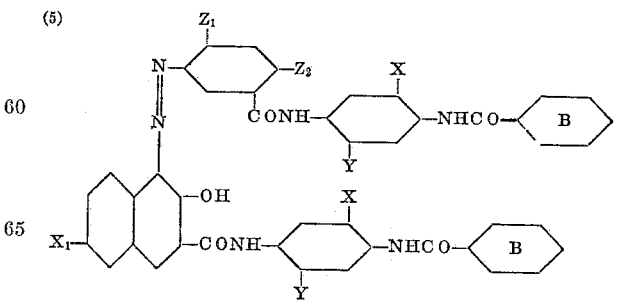

in which X and Y each represent a chlorine atom or a methyl group and $Z_1$, $Z_2$ and B have the meanings given above. These dyestuffs are distinguished by their especially high colouring power, their especially good fastness to light and migration, their high degree of thermo-stability, and their good resistance to solvents.

The pigments of the invention are useful for a very wide variety of application of pigments, for example, in a finely divided form for colouring artificial silk and viscose, cellulse ethers and esters, super-polyamides, or super-polyeruthanes or polyesters in spinning masses, or for colouring lacquers, lacquer-forming substances, solutions and products of acetyl-cellulose, nitro-cellulose, natural resins or synthetic resins, such as polyemrisation or condensation resins such, for example, as aminoplasts, alkyd resins, phenoplasts, polystyrene, polyvinyl chloride, polyethylene, polypropoylene, polyacryl, gums, casein, silicones and silicone resins. They may also be used with advantage in the manufacture of dystuffs, cosmetics and laminated sheet materials.

The following examples illustrate the invention, the parts and percentages being by weight:

*Example 1*

20.3 parts of the dyestuff obtained by coupling diazotized 5-amino-2:4-dichlorobenzoic acid with 2:3-hydroxynaphthoic acid are stirred for 3 hours at 115–120° C. with 250 parts of ortho-dichlorobenzene, 0.5 part of dimethyl-formamide and 12 parts of thionyl chloride. The reaction mixture is then cooled and the uniformly crystalline dicarboxylic acid chloride of the dyestuff obtained is filtered off, and then dried at 55–60° C. under vacuum, 22 parts of the di-acid chloride so obtained are stirred into 1000 parts of ortho-dichlorobenzene at 100° C. A warm solution of 28.5 parts of 2:5-dichloro-4-benzoylamino-aniline in 300 parts of ortho-dichlorobenzene are then poured into the mixture. The mixture is then stirred for 16 hours at 140–145° C. The pigment so obtained is filtered off at 120° C., washed with hot ortho-dichlorobenzene, hot benzene and methanol, and dried at 70–80° C. in vacuo. The pigment dystuff so obtained is a soft grained scarlet-red powder which colours polyvinyl foils scarlet-red tints of excellent fastness to light and migration. The dystuff corresponds to the following formula:

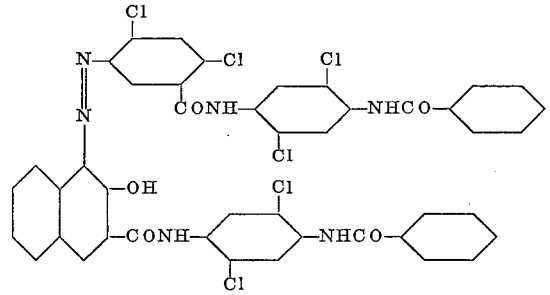

*Example 2*

65 parts of polyvinyl chloride, 35 parts of dioctyl phthalate and 0.2 part of the dyestuff obtained in Example 1 are stirred together and then rolled backwards and forwards for 7 minutes at 140° C. on a two-roller callender. The foil so obtained has a scarlet-red colour of very good fastness to light and migration.

In the following table are given further pigment dyestuffs which can be obtained by the method described above and which also have very good properties of fastness. Column 1 gives the diazo components, column II the coupling components, column III the amines with which the azo-dicarboxylic acid halides are condensed, and column IV the colours of foils of polyvinyl chloride coloured with pigments.

| No. | I | II | III | IV |
|---|---|---|---|---|
| 1 | 5-amino-2,4-dichlorobenzoic acid | 2:3-hydroxynaphthoic acid | 2:5-dimethyl-4-benzoylaminoaniline | Scarlet red. |
| 2 | ___do___ | ___do___ | 5-chloro-4-benzoylamino-2-methyoxyaniline | Do. |
| 3 | ___do___ | ___do___ | 2:5-dichloro-4(4'-chloro)-benzoylaminoaniline | Do. |
| 4 | ___do___ | ___do___ | 2:5-dichloro-4(2':4'-dichloro)-benzoylaminoaniline | Do. |
| 5 | ___do___ | ___do___ | 2:5-dimethyl-4(2':5'-dichloro)-benzoylaminoaniline | Do. |
| 6 | ___do___ | ___do___ | 2:5-dichloro-4(2':5'-dichloro)-benzoylaminoaniline | Bordeaux. |
| 7 | ___do___ | ___do___ | 2:5-dimethyl-4(4'-chloro)-benzoylaminoaniline | Red. |
| 8 | ___do___ | ___do___ | 2:5-dimethyl-4(2':4'-dichloro) benxoylaminoaniline | Scarlet red. |
| 9 | ___do___ | ___do___ | 2-methoxy-4(4'-chloro)-benzoylamino-5-chloraniline | Do. |
| 10 | 5-amino-2,4-dichloro benzoic acid | ___do___ | 2-methoxy-4-(α-naphthoylamino)-5-chloraniline | Do. |
| 11 | 5-amino-4-methoxy-2-chlorobenzoic acid | ___do___ | 2-methoxy-4-benzoylamino-5-chloroaniline | Bluish red. |
| 12 | ___do___ | ___do___ | 2:5-dichloro-4-benzoylaminoaniline | Bordeaux. |
| 13 | ___do___ | ___do___ | 2:5-dimethyl-4-benzoylaminoaniline | Bluish red. |
| 14 | 5-amino-4-methoxy-2-chlorobenzoic acid | ___do___ | 2:5-dichloro-4(4'-chloro)-benzoylaminoaniline | Red. |
| 15 | 3-amino-4(4'-chloro)-phenoxybenzoic acid | ___do___ | 2-methoxy-4-benzoylamino-5-chloraniline | Red. |
| 16 | ___do___ | ___do___ | 2-chloro-4-benzoylamino-5-methoxyaniline | Scarlet red. |
| 17 | ___do___ | ___do___ | 2:5-dichloro-4-benzoylaminoaniline | Red. |
| 18 | ___do___ | ___do___ | ___do___ | Scarlet red |
| 19 | 4-methoxy-3-aminobenzoic acid | ___do___ | 2-methoxy-4-benzoylamino-5-chloraniline | Bordeaux. |
| 20 | ___do___ | ___do___ | 2-chloro-4-benzoylamino-5-methoxyaniline | Red. |
| 21 | ___do___ | ___do___ | 2:5-dichloro-4-benzoylaminoaniline | Bordeaux. |
| 22 | ___do___ | ___do___ | 2:5-dimethyl-4-benzoylaminoaniline | Ruby. |
| 23 | ___do___ | ___do___ | 2:5-dichloro-4-(4'-chloro)-benzoylaminoaniline | Red. |
| 24 | ___do___ | ___do___ | 2:5-dichloro-4(2':5'-dichloro)-benzoylaminoaniline | Bordeaux. |
| 25 | ___do___ | ___do___ | 2:5-dichloro-4(2':4'-dichloro) benzoylaminoaniline | Scarlet red. |
| 26 | 4-ethoxy-3-aminobenzoic | ___do___ | 2:5-dichloro-4-benzoylaminoaniline | Bordeaux. |
| 27 | ___do___ | ___do___ | 2:5-dimethyl-4-benzoylaminoaniline | Ruby. |
| 28 | ___do___ | ___do___ | 2:5-dichloro-4-(2':4'-dichloro)-benzoylaminoaniline | Red. |

| No. | I | II | III | IV |
|---|---|---|---|---|
| 29 | ...do... | ...do... | 2:5-dimethyl-4-(4'-chloro)-benzoylaminoaniline | Ruby. |
| 30 | ...do... | ...do... | 2:5-dimethyl-4-(2':4'-dichloro)-benzoylaminoaniline. | Red. |
| 31 | 4-fluoro-3-aminobenzoic | ...do... | 2-methoxy-4-benzoylamino-5-chloranilne | Scarlet Red. |
| 32 | ...do... | ...do... | 2-chloro-4-benzoylamino-5-methoxyaniline | Do. |
| 33 | ...do... | ...do... | 2:5-dichloro-4-benzoylaminoaniline | Do. |
| 34 | ...do... | ...do... | 2:5-dimethyl-4-benzoylaminoaniline | Do. |
| 35 | 4-chloro-3-aminobenzoic acid | ...do... | 2-methoxy-4-benzoylamino-5-chloroaniline | Do. |
| 36 | ...do... | ...do... | 2-chloro-4-benzoylamino-5-methoxyaniline | Do. |
| 37 | ...do... | ...do... | 2:5-dichloro-4-benzoylaminoaniline | Do. |
| 38 | 4-chloro-3-aminobenzoic acid | ...do... | 2:5-dimethyl-4-benzoyl | Scarlet red. |
| 39 | ...do... | ...do... | 2:5-dichloro-4-(4'-chloro)-benzoylaminoaniline | Orange. |
| 40 | ...do... | ...do... | 2:5-dichloro-4-(2':4'-dichloro)-benzoylaminoaniline. | Do. |
| 41 | ...do... | ...do... | 2:5-dimethyl-4-(4'-chloro)-benzoylaminoaniline | Scarlet red. |
| 42 | ...do... | ...do... | 2:5-dimethyl-4-(2':5'-dichloro)-benzoylaminoaniline. | Red. |
| 43 | 4-bromo-3-aminobenzoic acid | ...do... | 2:5-dichloro-4-benzoylaminoaniline | Scarlet red. |
| 44 | ...do... | ...do... | 2-methoxy-4-benzoylamino-5-chloranilne | Red. |
| 45 | ...do... | ...do... | 2:5-dichloro-4-benzoylaminoaniline | Orange. |
| 46 | ...do... | ...do... | 2:5-dimethyl-4-benzoylaminoaniline | Scarlet red. |
| 47 | 4-methoxy-3-aminobenzoic acid | 6-bromo-2-oxy-3-naphthoic acid. | 2:5-dimethyl-4-benzoylaminoaniline | Ruby. |
| 48 | ...do... | ...do... | 2:5-dichloro-4-benzoylaminoaniline | Do. |
| 49 | ...do... | ...do... | 2:5-dichloro-4-(2':4'-dichloro)-benzoylaminoaniline. | Violet. |
| 50 | ...do... | ...do... | 2:5-dimethyl-4-(4'-chloro)-benzoylaminoaniline | Ruby. |
| 51 | ...do... | ...do... | 2:5-dimethyl-4-(2':5'-dichloro)-benzoylaminoaniline. | Bordeaux. |
| 52 | 4-amino-3-nitrobenzoic acid | 2,3-hydroxynaphthoic acid | 2,5-dichloro-4-benzoylaminoaniline | Orange. |
| 53 | ...do... | ...do... | 2,5-dichloro-4-(4'-chloro)-benzoylaminoaniline | Do. |
| 54 | ...do... | ...do... | 2,5-dimethyl-4(2',5'-dichloro)-benzoylaminoaniline. | Do. |
| 55 | ...do... | ...do... | 2,5-dimethyl-4-benzoylaminoaniline | Brown orange. |
| 56 | ...do... | ...do... | 2,5-dimethyl-4(4'-chloro)-benzoylaminoaniline | Red orange. |

What I claim is:
1. An azo-dyestuff of the formula

(1) 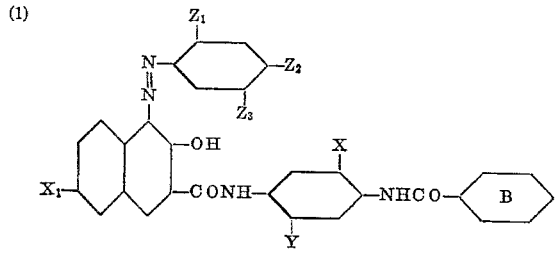

in which X is a member selected from the group consisting of methyl, chlorine and bromine, Y is a member selected from the group consisting of methyl, methoxy, chlorine and bromine, $X_1$ is a member selected from the group consisting of hydrogen and bromine, the benzene residue B may contain as further substituents chlorine atoms, $Z_1$ is a member selected from the group consisting of chlorine, nitro, methoxy, ethoxy and phenoxy, $Z_2$ is a member selected from the group consisting of hydrogen, chlorine and the group of the formula (2) 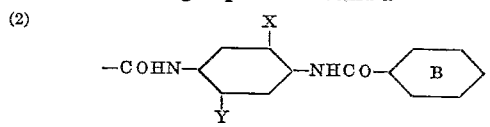

and $Z_3$ is a member selected from the group consisting of hydrogen and the group of the Formula 2, and wherein only one of the substituents $Z_2$ and $Z_3$ represents the group of the Formula 2.

2. The dyestuff of the formula

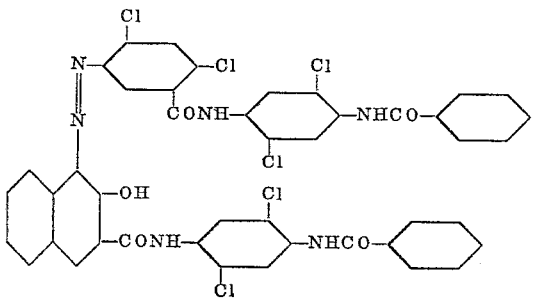

3. The dyestuff of the formula

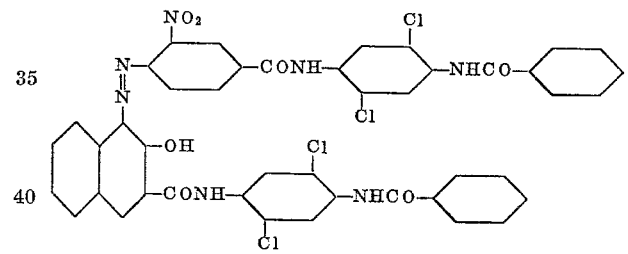

4. The dyestuff of the formula

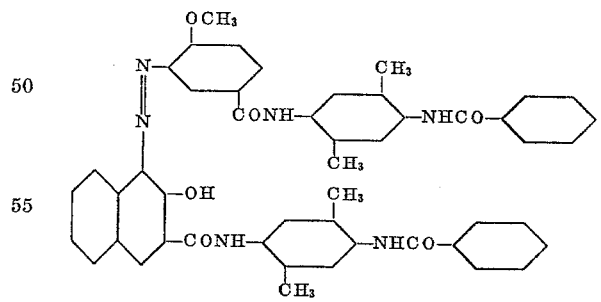

5. The dyestuff of the formula

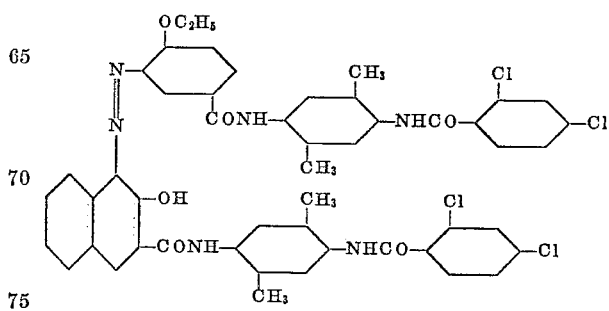

6. The dyestuff of the formula
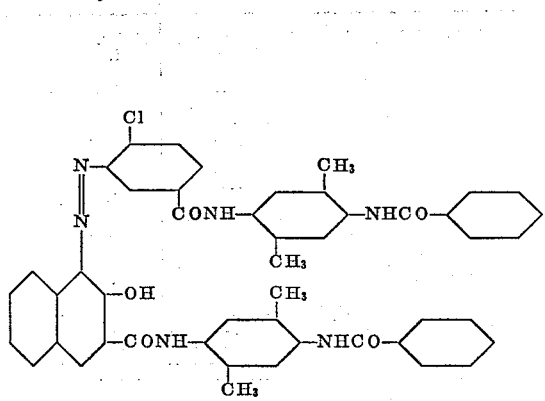
7. The dyestuff of the formula
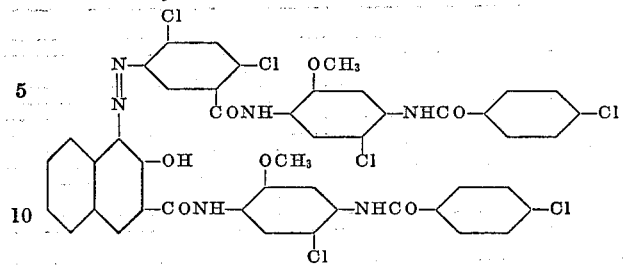
References Cited by the Examiner
UNITED STATES PATENTS
2,088,726   8/1937   Sexton _____ 260—203
CHARLES B. PARKER, *Primary Examiner.*